US012668991B2

(12) United States Patent
Edokpayi et al.

(10) Patent No.: US 12,668,991 B2
(45) Date of Patent: Jun. 30, 2026

(54) LOW PROFILE ANTI-LIGATURE LATCH HANDLE FOR SLIDING DOORS

(71) Applicant: Overhead Door Corporation, Lewisville, TX (US)

(72) Inventors: Frank Isioma Edokpayi, Corpus Christi, TX (US); Daniel Seymour, Durham, CT (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 18/798,503

(22) Filed: Aug. 8, 2024

(65) Prior Publication Data

US 2026/0043268 A1 Feb. 12, 2026

(51) Int. Cl.
*E05B 1/00* (2006.01)

(52) U.S. Cl.
CPC .................................... *E05B 1/003* (2013.01)

(58) Field of Classification Search
CPC ........ E05B 1/003; E05B 1/0007; E05B 15/10; E05B 65/0017; Y10T 292/57; Y10T 292/0833; Y10S 292/31; Y10S 292/65; E05C 1/166
USPC ..................................... 70/208–210; 292/347
See application file for complete search history.

(56) References Cited

U.S. PATENT DOCUMENTS

| | | | | | |
|---|---|---|---|---|---|
| 1,326,450 | A * | 12/1919 | Howard et al. | E05B 1/0015 | 292/336.3 |
| 2,744,406 | A * | 5/1956 | Labrie | E05B 65/0811 | 292/DIG. 31 |
| RE24,443 | E * | 3/1958 | Labrie | E05B 65/0811 | 70/96 |
| 5,303,965 | A * | 4/1994 | Meehan | G05G 5/04 | 292/336.3 |
| 6,596,952 | B1 * | 7/2003 | Degrazia | H01H 9/282 | 200/43.16 |
| 7,401,484 | B1 * | 7/2008 | Holmes | E05B 13/10 | 70/423 |
| 8,291,733 | B2 * | 10/2012 | Chiou | E05B 55/005 | 70/279.1 |

(Continued)

FOREIGN PATENT DOCUMENTS

| | | | | |
|---|---|---|---|---|
| GB | 2413068 A | * 10/2005 | | E05B 1/003 |
| GB | 2515455 A | * 12/2014 | | E05B 35/008 |

(Continued)

*Primary Examiner* — Steven A Tullia
(74) *Attorney, Agent, or Firm* — Haynes and Boone, LLP

(57) ABSTRACT

A door handle system is described. The door handle system includes: a door handle having: a lower grip portion an upper actuation portion; an angled projection located on the upper actuation portion; handle attaching structure, and a door plate having: attaching structure configured to allow the door plate to attach to a door; door plate attaching structure for interfacing with the handle attaching structure for allowing the handle to pivotally attach to the door plate; a front face; and channel defining structure in the front face defining a channel in the front face for allowing clearance for the angled projection to extend through the front face into the channel and move in the channel when the door handle is pivoted with respect to the door plate. A method of keeping elongated members from being retained by a door handle system is also described.

20 Claims, 11 Drawing Sheets

(56) References Cited

U.S. PATENT DOCUMENTS 8,430,436 B2 * 4/2013 Shilts .................. E05B 65/0017
292/347
8,534,723 B2 * 9/2013 Berger .................. E05B 13/005
292/336.3
D690,577 S * 10/2013 Eller .............................. D8/331
8,584,494 B2 * 11/2013 Salvatore ................ E05B 1/003
70/91
8,720,960 B2 * 5/2014 Nadgouda ............. E05B 13/005
292/347
8,740,266 B2 * 6/2014 Keller ................... E05B 1/0007
292/351
8,777,282 B1 * 7/2014 Shilts .................... E05B 1/0007
292/347
8,991,881 B2 * 3/2015 Shilts ...................... E05B 15/10
292/347
9,033,375 B1 * 5/2015 Moon ..................... E05B 1/003
292/336.3
9,249,599 B2 * 2/2016 Berger .................... E05B 1/003
9,290,963 B2 * 3/2016 Berger .................. E05B 13/106
9,694,505 B2 * 7/2017 Clifford ................. B26D 1/025
9,714,525 B2 * 7/2017 Eller ................... E05B 65/0032
9,859,069 B2 * 1/2018 Sambar ................... E05B 17/22
D843,811 S * 3/2019 Riley ............................. D8/331
10,610,037 B1 * 4/2020 deLoache, III ....... F16B 45/008
11,156,016 B2 * 10/2021 Riley ........................ E05B 3/06
11,585,116 B2 * 2/2023 Riley ...................... E05B 3/065
11,879,270 B2 * 1/2024 Szczerkowski ..... E05B 17/0062
2005/0156441 A1 * 7/2005 Tsai ........................ E05B 63/04
292/336.3
2009/0158787 A1 * 6/2009 Lin ........................ B25H 3/006
70/58
2010/0072762 A1 * 3/2010 Marks ................... E05B 1/0007
292/336.3
2025/0263574 A1 * 8/2025 Riley ...................... B29C 63/02

FOREIGN PATENT DOCUMENTS

JP H05240972 A * 9/1993 ............. G12B 11/00
KR 200356472 Y1 * 7/2004 ............... E05B 3/00
KR 20120004768 U * 7/2012 ........... E05B 1/0007

* cited by examiner

LOW PROFILE ANTI-LIGATURE LATCH HANDLE FOR SLIDING DOORS

TECHNICAL FIELD

The present disclosure relates generally to handles for door systems, and more particularly, to an anti-ligature latch handle for siding doors.

BACKGROUND

Sliding and swing doors are commonly used in health care facilities. For privacy, security, and other reasons, sliding doors and swing doors often have latches or locks to keep the sliding door closed. Latch handles are used to articulate the latching or locking mechanism to allow a door to be opened and act as a grab handle for opening and closing a door.

Ligature is a binding or tying material used to tightly connect objects or secure something in place, often referring to a tie around the neck causing compression of airways, resulting in suffocation and death. Within mental health facilities, "ligature" can refer to self-harm. "Ligature points" (points or places where elongated members or ligatures may be secured to anchor one end of the elongated member or ligature) continue to be one of the main safety concerns in Mental Health inpatient facilities globally.

Anti-ligature refers to devices or products designed to prevent individuals from self-harm or suicide by removing or reducing the possibility of using ligatures to inflict harm or suicide. It is a safety measure used in hospitals, prisons, and mental health facilities to protect vulnerable individuals from harming themselves. The practice aims to lower ligature risk, risk of patient harm and suicide.

An additional problem with some door handles separate from the issue of risk associated with being a ligature point, is that door handles can sometimes inadvertently snare fluid lines, cords, or other long thin objects.

Accordingly, a door handle that addresses the above described problems with some door handles found in the art is desired.

SUMMARY

The foregoing needs are met to a great extent by embodiments in accordance with the present disclosure, wherein, in some embodiments an anti-ligature handle is provided. Anti-ligature handles in accordance with some embodiments of the present disclosure can provide multiple benefits. They may be designed in such a way that the external shape/geometry of the handle makes it extremely difficult or impossible to tie or hang a rope on it which can reduce the likelihood of self-harm. Further, some anti-ligature handles described herein can provide the additional benefit in hospitals, other health care facilities, or in other facilities in general, in that such handles can help avoid fluid lines, cords, or other long thin objects from getting caught on them. The disclosure described herein is an anti-ligature door handle that may work with a positive latch mechanism for doors. The apparatus described herein has a unique geometry and component design that may make it narrower in total thickness, more robust, and resistant to being a ligature point, and/or snagging fluid lines, cords, or other long thin objects than other some other door handles.

In one aspect, the disclosure describes a door handle system. The door handle system includes: a door handle having: a lower grip portion an upper actuation portion; an angled projection located on the upper actuation portion; handle attaching structure, and a door plate having: attaching structure configured to allow the door plate to attach to a door; door plate attaching structure for interfacing with the handle attaching structure for allowing the handle to pivotally attach to the door plate; a front face; and channel defining structure in the front face defining a channel in the front face for allowing clearance for the angled projection to extend through the front face into the channel and move in the channel when the door handle is pivoted with respect to the door plate.

In another aspect, the disclosure describes a door handle system. The door handle system includes: a door handle having: a lower grip portion; an upper actuation portion; handle attaching structure, and a door plate having: attaching structure configured to allow the door plate to attach to a door; door plate attaching structure for interfacing with the handle attaching structure for allowing the handle to pivotally attach to the door plate wherein both the door handle and the door plate are pivotally attached to each other via the handle attaching structure and the door plate attaching structure and the handle attaching structure and the door plate attaching structure are covered by the door handle and the door plate; a front face; and snag free smooth surfaces located on the door handle and the door plate wherein, the smooth surfaces on the door plate and the handle are configured to direct a ligature that contacts the door system away the handle and away from a space between the handle and the door plate.

The disclosure also provides, in another aspect, a method of keeping elongated members from being retained by a door handle system. The method includes: providing snag free smooth surfaces located on a door handle and providing snag free smooth surfaces on a door plate; covering a space between the handle and door plate with a projection on the handle extending toward the door plate; and defining a handle projection channel in the door plate to allow the projection on the handle move within the door plate when the handle pivots with respect to the door plate, wherein, the smooth surfaces on the handle and door plate and projection on the handle are configured to direct elongated members that contact the door system away from the handle and away from a space between the handle and the door plate.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION

Figure 1:
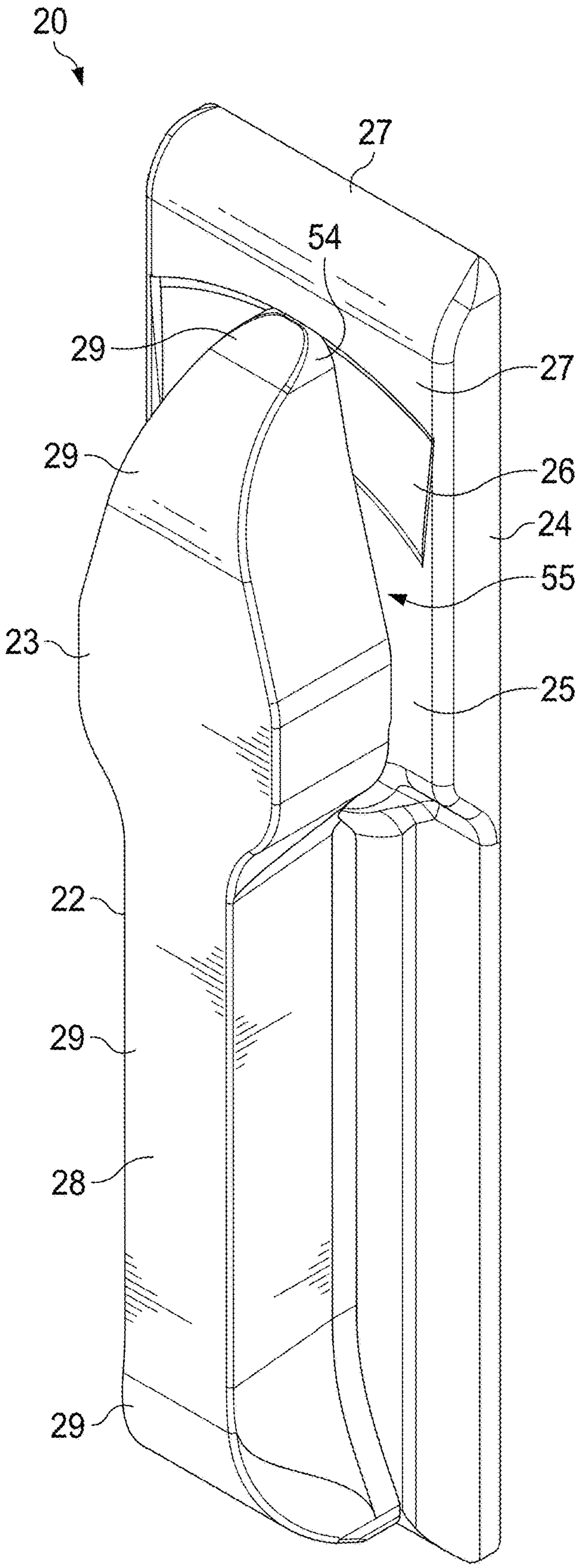
FIG. 1 is a perspective view of a handle system in accordance with the present disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

FIG. 1 shows a front perspective view of a door handle system 20 in accordance with the present disclosure. The door handle system 20 includes a handle 22 and a back plate 24. The back plate 24 has a front face 25 and a channel 26 sunken in from the front face 25. The front face 25 of the back plate 24 includes smooth, snag-free surfaces 27.

The handle 22 has an upper actuating portion 23, and a gripping portion 28. The actuating portion 23 houses features that will be explained later below. The gripping portion 28 is configured to allow a user to grab the gripping portion 28 and pivot the handle 22 in order to actuate the handle system 20 to unlatch the door (not shown) on which the handle system 20 is mounted to open the door. The handle 22 has smooth, snag free surfaces 29. The snag-free surfaces 27 29 of the back plate 24 and handle 22 are sloped and configured to resist a ligature from attaching to or snagging on the handle system 20. Rather, if a ligature, tube, hose, cord, or other similar type object contacts the handle system 20 the object is directed by the shape and slope of the surfaces 27, 29 to slide off of the handle system 20.

Figure 2:
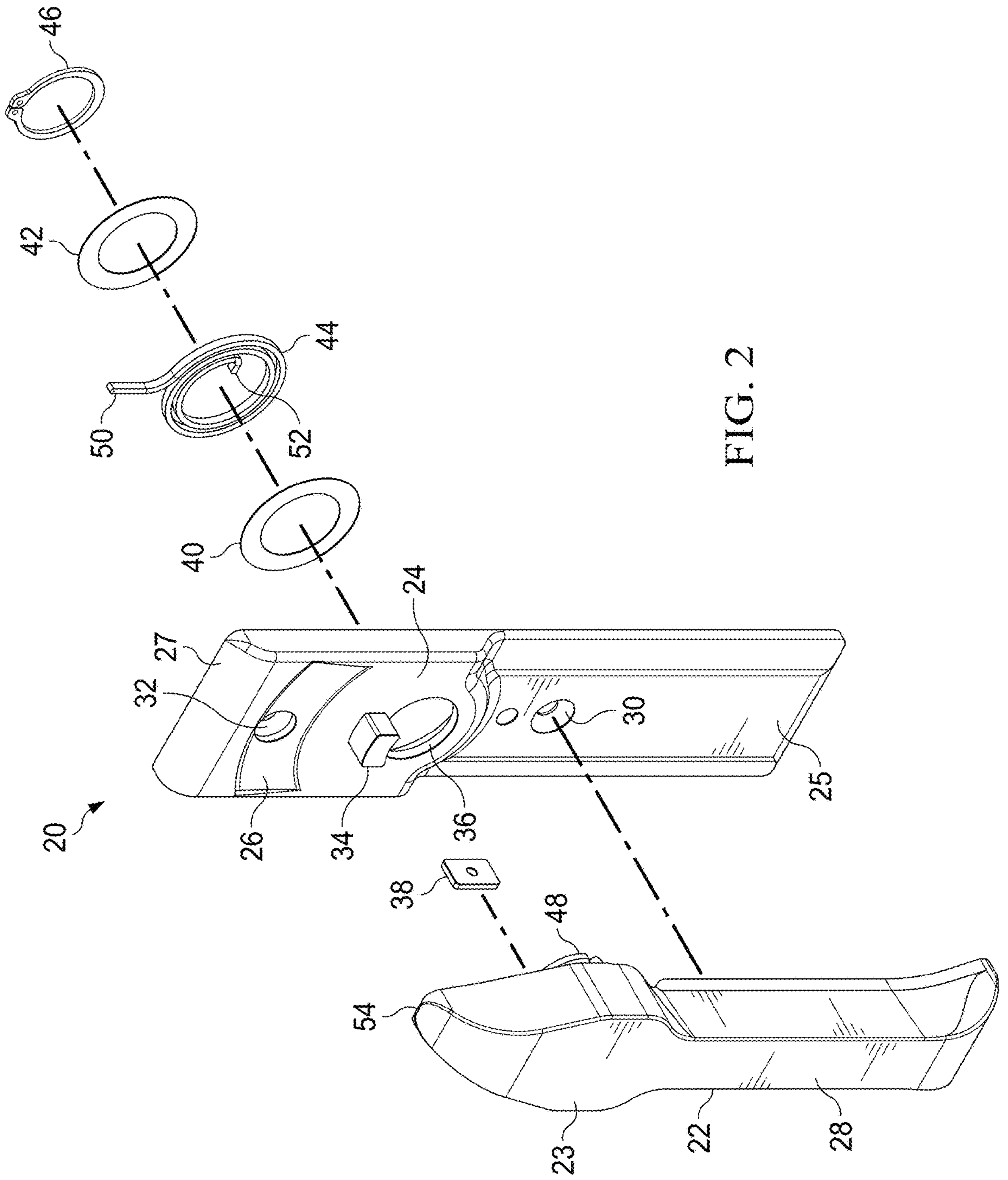
FIG. 2 is a front exploded perspective view of a handle system in accordance with the present disclosure.
Figure 3:
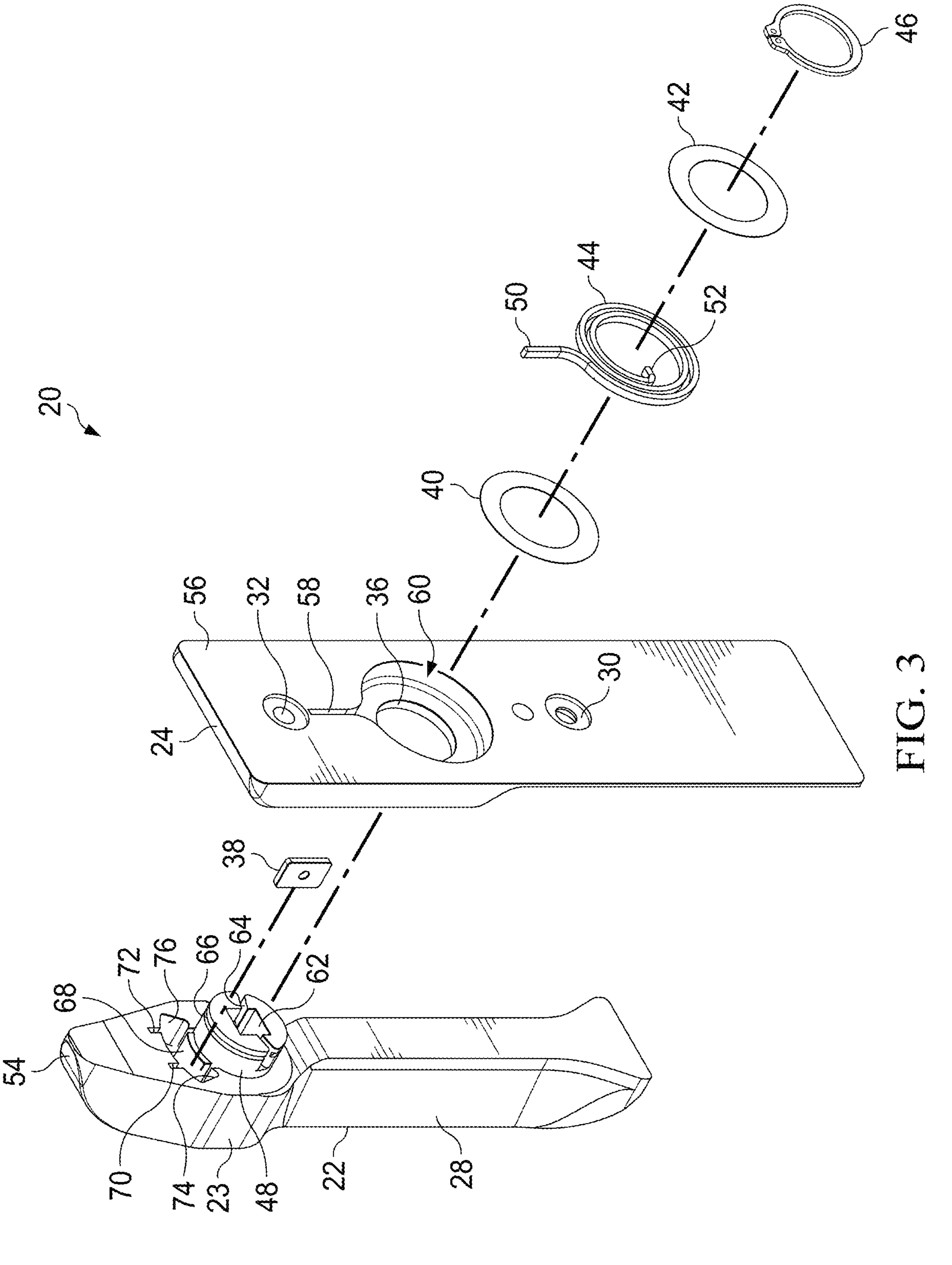
FIG. 3 is a rear exploded perspective view of a handle system in accordance with the present disclosure.

FIGS. 2 and 3 are front and back exploded perspective views of the door handle system 20 showing both external and internal components. The upper actuation portion 23 and gripping portion 28 of the handle 22 are shown. The back plate 24 is also shown. Fastener holes 30 and 32 are shown in the back plate 24 which provide a way for fastening structure to attach the fastener system 24 and more particularly the back plate 24 to a door (not shown). Fasteners (not shown) such as screws, nails, bolts, or other suitable fasteners extend through the fastener holes 32 and 34 to attach the back plate 24 and door handle system 20 to a door.

A protrusion 34 is mounted on the front face 25 of the back plate 24. In some embodiments, the protrusion 34 is arch shaped. In other embodiments, the protrusion 34 may have other shapes.

As shown in FIG. 2, 3, 4, or 5, the back plate 24 has an operational hole 36 in which the internal parts fit except for the stop tab 38 (shown for example in FIGS. 2 and 3). The internal parts include a first shim 40, a second shim 42, spring 44, and retaining ring 46. The shims 40 and 42 may be made of steel, stainless steel, aluminum, plastic, rubber or any other suitable material. The shims 40 and 42 help to keep the torsion spring 44 in position. The retaining ring 46 keeps the shims 40, 42 and spring 44 positioned on the protrusion 48 which is on the handle 22. The spring 44 has an elongated end 50 and short end 52 which helps the spring 44 urge against the handle 22 while being anchored against the back plate 24 in a desired manner which will be explained in more detail later below.

Returning to the handle 22, in some embodiments and as shown in several of the FIGS. and in particular FIGS. 1-3 and 6, the top of the handle 22 has an angled protrusion 54. As seen FIG. 1, the angled protrusion 54 extends into the channel 26 in the back plate 24. Having the angled protrusion 54 extend in the channel 26 aides in reducing the likelihood a ligature, tube, hose, cord, or other similar type object attaches to, connects or snags on the handle system 20. In addition, having the angled protrusion 54 extend into the channel 26 helps reduce any gap 55 between the handle 22 and the backplate 24 that could cause a ligature, tube, hose, cord, or other similar type object to get caught in the space 55.

Figure 6:
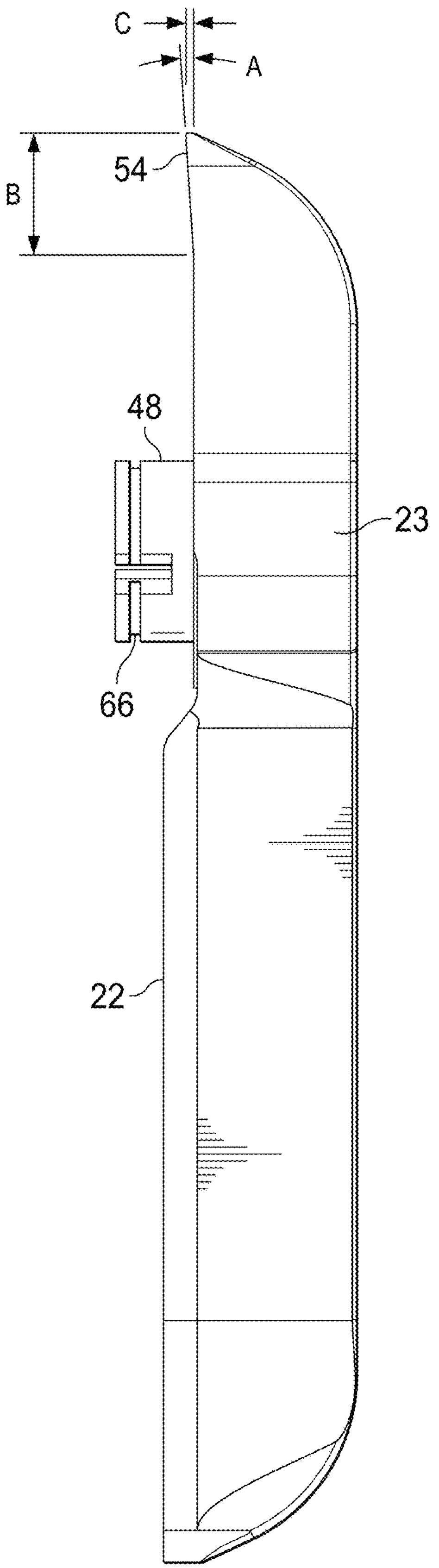
FIG. 6 is a side view of a handle portion of a handle system in accordance with the present disclosure.
Figure 7:
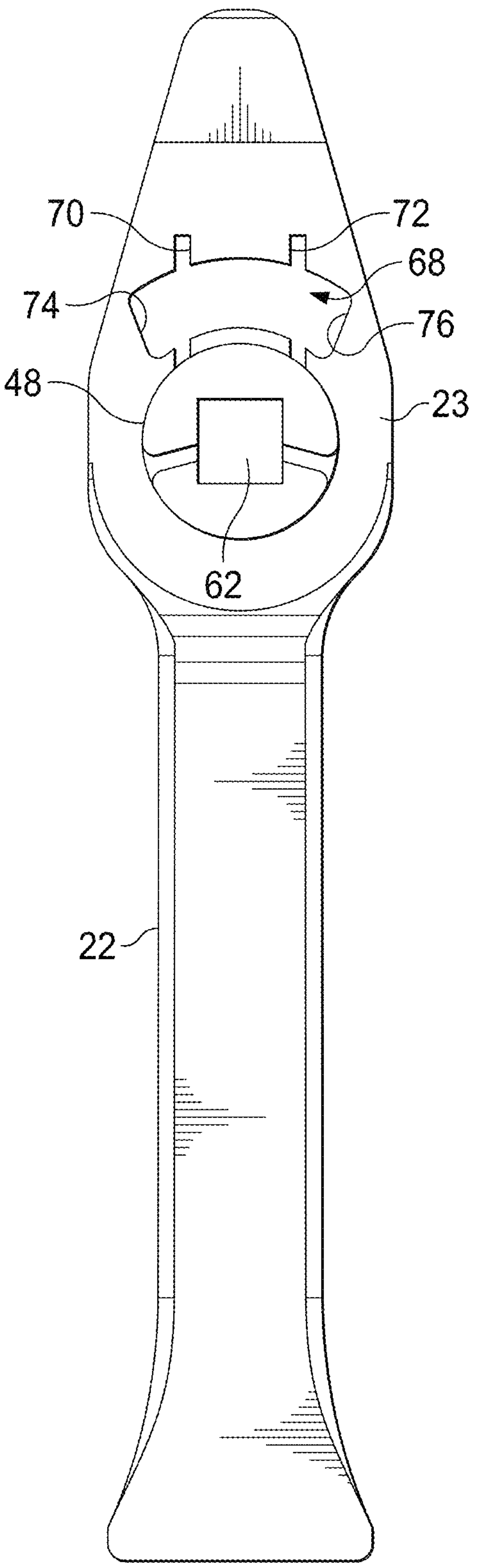
FIG. 7 is a rear view of a handle in accordance with a handle system in accordance with the present disclosure.
Figure 8:
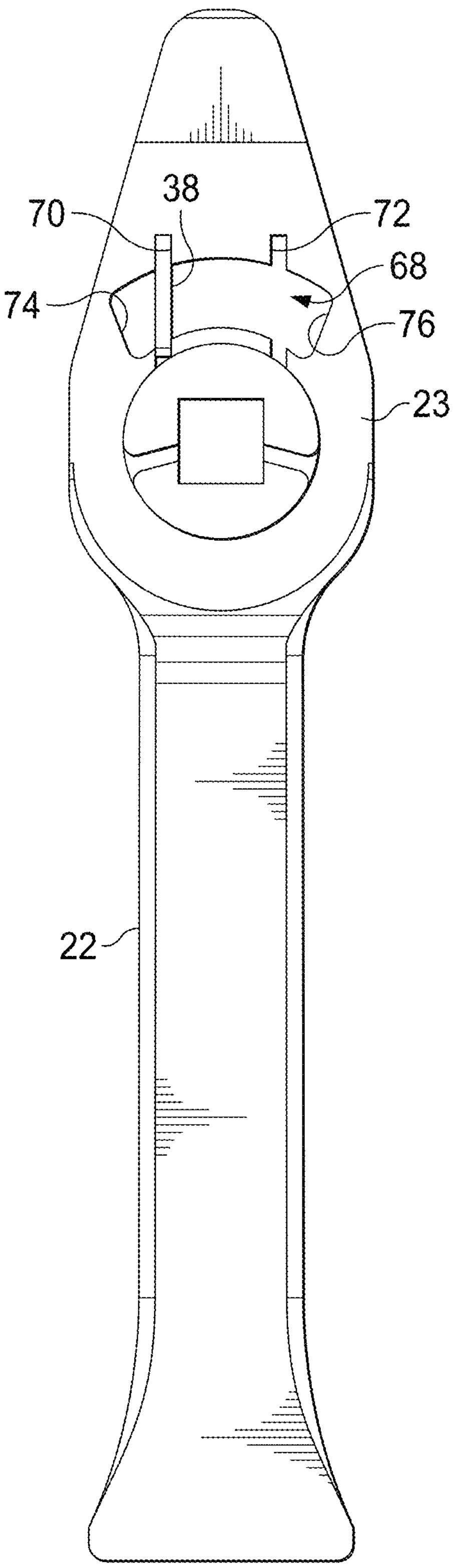
FIG. 8 is a rear view of a handle in accordance with a handle system in accordance with the present disclosure.
Figure 9:
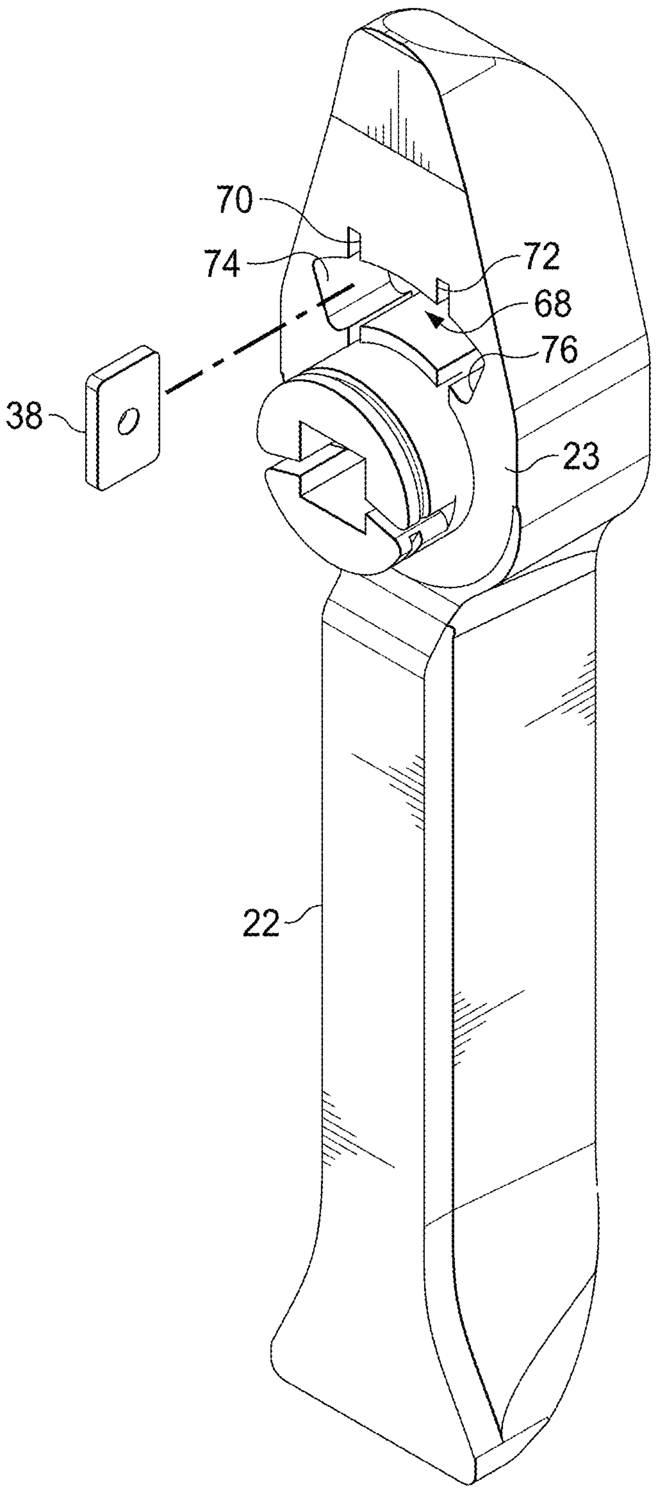
FIG. 9 is a rear perspective view of a handle in accordance with a handle system in accordance with the present disclosure.

FIG. 6 illustrates the angled protrusion 54. The angle A as shown in FIG. 6 may be between 2° and 6° degrees and preferably 4°. In other embodiments, angle A can be zero or any other suitable amount. Distance B which shows where the angle starts to the end of the angled protrusion 54 may be between 0.498 and 0.506 inches and preferably about 0.502 inches. As shown in FIG. 6, off set distance C, the distance between the top tip of the angled protrusion 54 and the back surface of the handle 22 and may be 0.027 to 0.036 inches and preferably about 0.031 inches. Other embodiments may use other dimensions.

Figure 4:
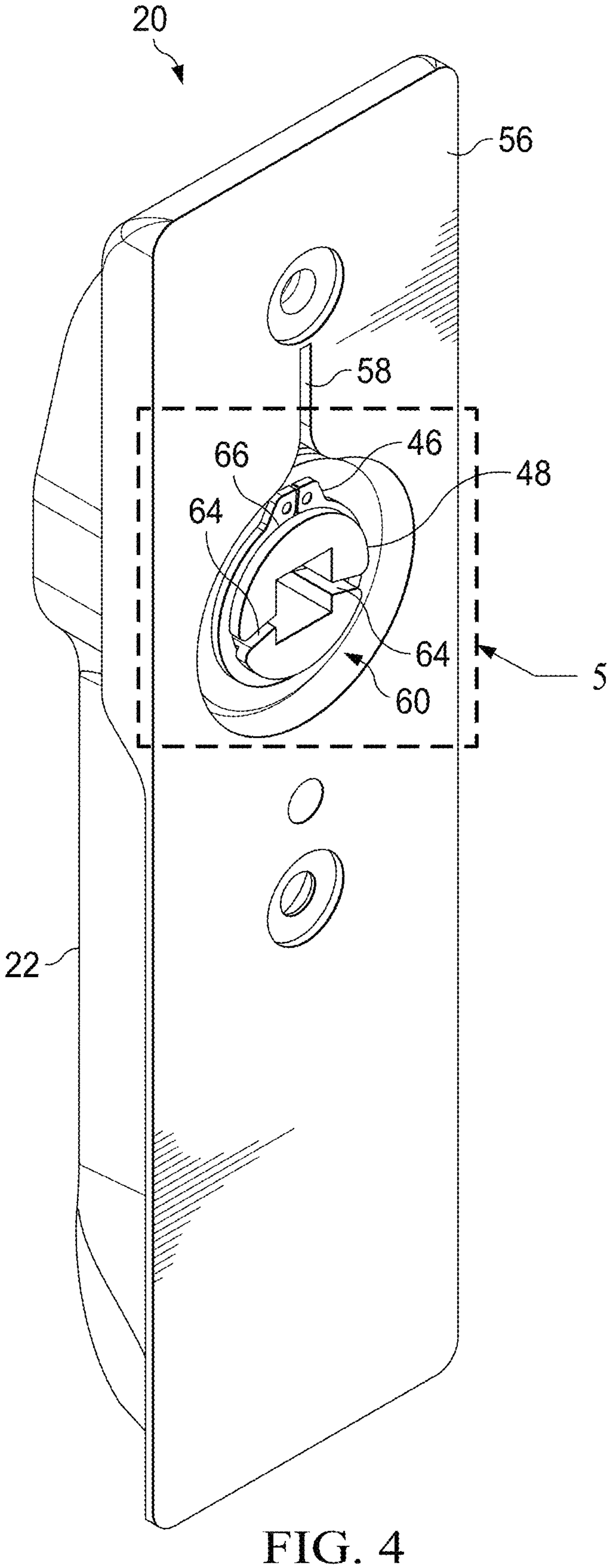
FIG. 4 is a rear perspective view of a handle system in accordance with the present disclosure.
Figure 5:
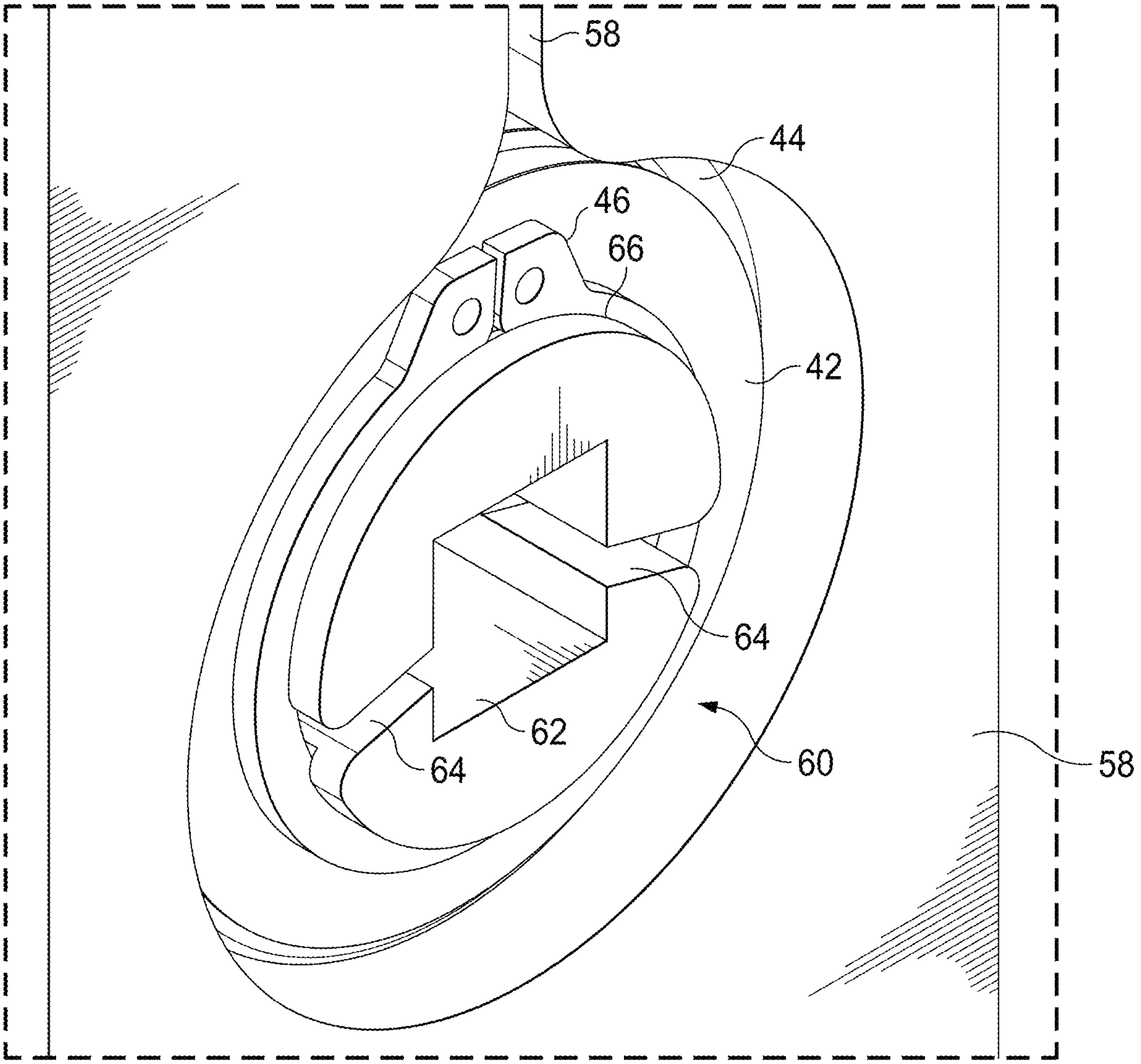
FIG. 5 is a partial enlarged rear perspective view of a handle system shown in FIG. 4.

FIG. 3 is an exploded rear view of handle system 20. FIG. 4 is an assembled view and FIG. 5 is an enlarged detail view of the part of FIG. 4 enclosed by line 5. As shown in one or more of these views, the back 56 of the back plate 24 is shown with a spring retaining groove 58 that is configured and dimensioned to fit and secure the elongated spring end 50 of the spring 44. The shims 40, 42 spring 44 and retaining ring 46 are mounted on the operative protrusion 48 of the handle 22. The operative protrusion 48 and shims 40, 42 spring 44 and retaining ring 46 fit within the assembly void or hole 60 in the back plate 24.

The operative protrusion 48 defines an actuation hole 62 for attaching to and actuating a latch/lock mechanism (not shown) in a door (not shown). Such latch/lock mechanisms are well known in the art and will not be explained in detail here. As shown in the FIGS, the actuation hole 62 is square-shaped to fit and interact with standard square rods of existing latch/lock mechanisms, but in other embodiments the actuation hole 62 could be any other shape or even include a protrusion in order to attach, interface and actuate any suitable latch/lock mechanism desired. In other words, in some embodiments, the actuation hole 62 can be substituted for any suitable attaching structure to attach, interface and actuate any suitable latch/lock mechanism.

As shown in FIGS. 3-6, the operative protrusion 48 has a spring retaining groove 64. The short end of the spring 52 fits in and is retained by the spring retaining groove 64. In some embodiments, there may be two spring retaining grooves 64 so that the spring 44 may be placed in either a right hand or left hand configuration and thereby biasing the handle 22 to the right or left. By placing the spring 44 in the spring retaining groove 58 (on the back of the back plate 24) and the spring retaining groove 64 (in the operative protrusion 48 of the handle 22) the spring 44 can bias the handle 22 to a resting position and urge the handle 22 when it is pivoted away from the resting position to move back to the resting position.

The operative protrusion 48 has a snap ring groove 66. The snap ring (aka the retaining ring) 46 fits in the snap ring groove 66 and retains the shims 40 42, and the spring 44 in place on the operative protrusion 48 on the handle 22.

The operative protrusion 48 on the handle 22, the operative hole 36 in the back plate 12, the ring groove 66, and the retaining ring 46 may be considered attaching structure as the handle 22 attaches to the back plate 12 by the operative protrusion 44 extending through the operative hole 36 in the back plate 12 and having the retaining ring 46 fit into the groove 66.

The retaining ring (or snap ring) 46 is dimensioned to be larger in diameter than the diameter of the operative hole 36 in the back plate 12. As a result, when the retaining ring 46 is fitted into the ring groove 66 the retaining ring 46 keeps the handle 22 connected to the back plate 24. The circular shape of the operative protrusion 48 and the operative hole 36 allows the handle 22 to be pivotable connected to the back plate 24.

As shown in FIGS. 3 and 7-11 the handle 22 has a travel limit hole 68. The protrusion 34 (see FIG. 2) on the back plate 24 fits into the travel limit hole 68. The travel limit hole 68 optionally includes a left stop limit tab groove 70 a right stop limit tab groove 72 in addition to the left stop wall 74 and right stop wall 76. The stop walls 74 and 76 provide hard stops to limit the pivotal travel of the handle 22 with respect to the back plate 24 because the protrusion 34 on the back plate 24 will contact the one or the other of the stop walls 74 76 when the handle 22 is rotated and thereby prevent further rotational movement of the handle 22 with respect to the back plate 24.

Figure 10:
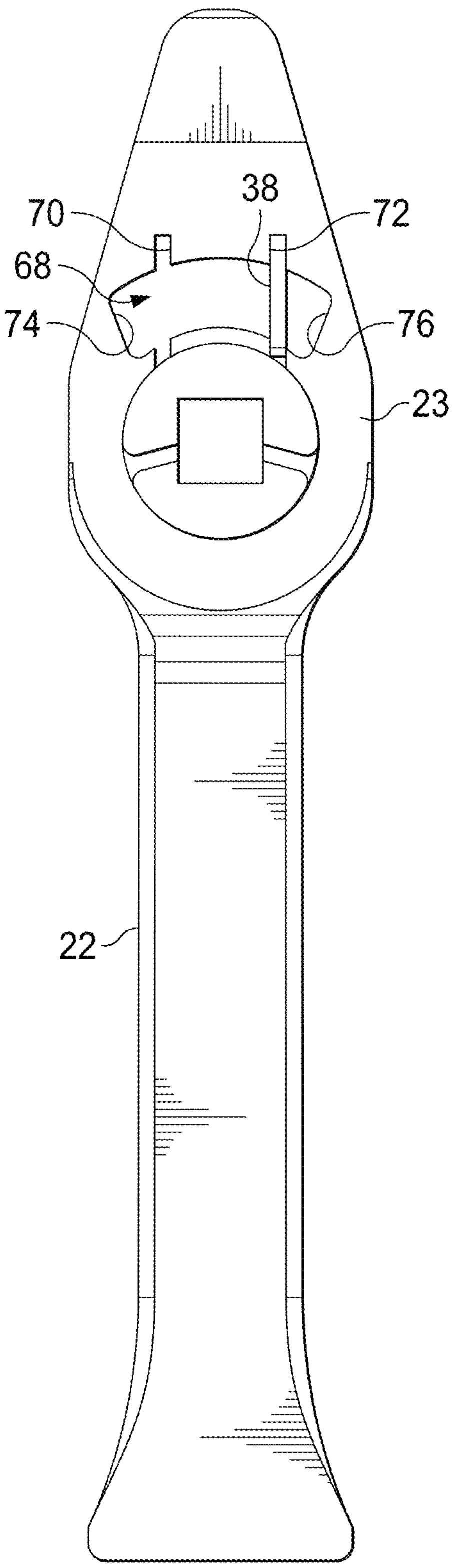
FIG. 10 is a rear view of a handle in accordance with a handle system in accordance with the present disclosure.
Figure 11:
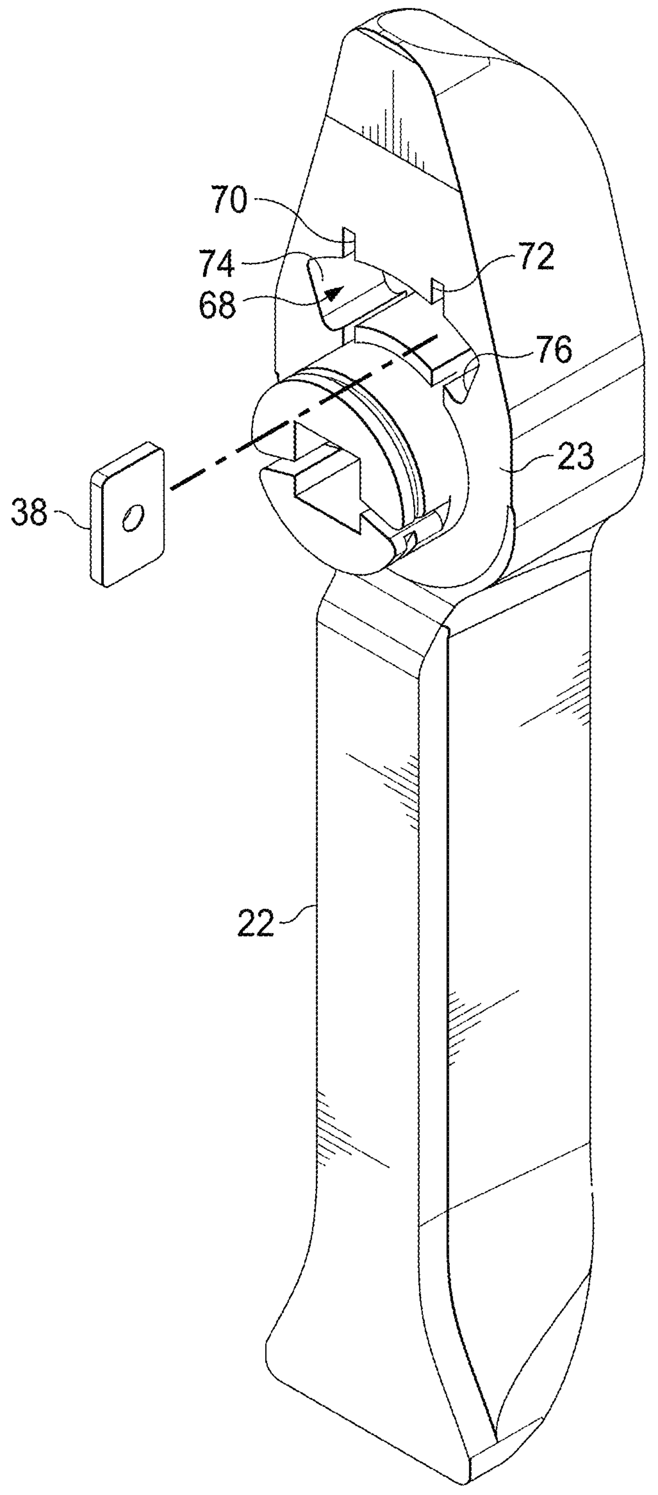
FIG. 11 is a rear perspective view of a handle in accordance with a handle system in accordance with the present disclosure.

In optional embodiments, the travel limits of the handle 22 may be modified by inserting the stop tab 38 into one of the stop tab grooves 70 72. FIGS. 8-11 are rear and exploded views of the handle 22 with the stop tab 38 installed in the left stop tab groove 70 (FIGS. 8-9) or the right stop tab groove 72 (FIGS. 10-11). The location of the stop tab groove 70 and 72 are selected so that when the stop tab 38 is inserted it to one or the other stop tab grooves 70 and 72 the handle 22 is prevented from being rotated to the right or to the left. In this manner the handle 22 may only be permitted to rotate in one direction to actuate the latching/locking mechanism of the door. When the handle 22 is released, the handle 22 may rotate via the spring 44 back to a neutral position. Other embodiments may locate the stop tab grooves 70 72 to allow the handle 22 to rotate between different limits as defined by the protrusion 34 contacting either the stop tab 38 located in one of the stop tab grooves 70 72 and one of the stop walls 74 76 of the travel limit hole 68. Removal or omission of the stop tab 38 will cause the handle 22 to be able to rotate within the limits of the stop walls 74 76.

While the embodiments shown in the FIGS. and described herein show and describe holes, grooves, protrusions and the like to be on one part it will be understood that locations of these or other parts maybe be reversed or rearranged and still not depart form the spirit and scope of the appended claims and thereby fall within the spirit and scope of the appended claims.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

We claim:

1. A door handle system comprising:

a door handle having a front surface facing away from a door and having a back surface facing toward the door, the door handle comprising:
- a lower grip portion;
- an upper actuation portion;
- a protrusion located on the upper actuation portion, the protrusion extending closer to the door than the back surface; and
- a handle attaching structure, and a door plate comprising:
- an attaching structure configured to allow the door plate to attach to the door;
- a door plate attaching structure for interfacing with the handle attaching structure for allowing the door handle to pivotally attach to the door plate;
- a front face; and
- a channel defining structure in the front face defining a channel in the front face for allowing clearance for the protrusion to extend through the front face into the channel and move in the channel when the door handle is pivoted with respect to the door plate.

2. The door handle system of claim 1, further comprising smooth surfaces located on the door handle angled downward and configured to cause a ligature contacting the door handle to slide off of the door handle.

3. The door handle system of claim 2, further comprising a smooth surface on the door plate configured to cause a ligature to slide off of the door plate onto the door handle and the smooth surfaces on the door handle and off the door handle system.

4. The door handle system of claim 1, wherein the protrusion comprises a front side facing away from the door and a back side facing toward the door, the front side having a smooth surface and the back side entering the channel in the door plate, wherein the smooth surface on the door plate or the smooth surface on the front side of the protrusion is configured to direct a ligature that contacts the door plate or the door handle away from a space between the door handle and the door plate.

5. The door handle system of claim 1 further comprising:

a stop projection located on either one of the door handle and door plate;

a structure defining a stop hole located on the other of the door handle and door plate than the stop projection the structure defining the stop hole configured and dimensioned to allow the stop projection to fit in the stop hole and limit pivotal movement of the door handle with respect to the door plate; and a spring located in at least one of either the handle attaching structure and the door plate attaching structure and configured to bias the door handle to a particular pivotal position with respect to the door plate.

6. The door handle system of claim 5, wherein one of either the handle attaching structure or the door plate attaching structure is an attaching projection, and the other of the handle attaching structure or the door plate attaching structure that is not an attaching projection incudes an attaching hole dimensioned and configured to allow the attaching projection to fit in the attaching hole.

7. The door handle system of claim 6, further comprising a retaining groove located on the attaching projection; and a snap ring and the spring is mounted on the attaching projection and held in place by a snap ring located in the retaining groove.

8. The door handle system of claim 7 further comprising a shim mounted on the attaching projection and contacting the spring.

9. The door handle system of claim 6, further comprising;

an elongated end on the spring;

a spring retaining groove located adjacent to the attaching hole; and the elongated end of the spring is located in the spring retaining groove.

10. The door handle system of claim 9, further comprising spring groove located on the attaching projection and dimensioned and configured to receive an end of the spring opposite the elongated end of the spring and allow the spring to urge against the door handle.

11. The door handle system of claim 5, further comprising:

a stop tab groove in the stop hole; and a stop tab configured to fit in the stop tab groove and thereby further limit travel of the stop projection in the stop hole than what would be permitted by the stop hole if the stop tab is not present.

12. The door handle system of claim 11, further comprising a second stop tab groove in the stop hole there by allowing the stop tab to be placed in either stop tab groove and thereby further limit travel of the stop projection in the stop hole than what would be permitted by the stop hole if the stop tab was not present.

13. The door handle system of claim 1, further comprising door latching interface structure located on the door handle for permitting the door handle to connect to a door latch and articulate the door latch when the door handle is pivoted.

14. The door handle system of claim 1, wherein the protrusion is at an angle between 3-5 degrees from a flat surface on a back portion of the door handle.

15. A door handle system comprising:

a door handle having a front surface facing away from a door and having a back surface facing toward the door, the door handle comprising:

a lower grip portion;

an upper actuation portion;

a protrusion located on the upper actuation portion, the protrusion extending closer to the door than the back surface; and a handle attaching structure, and a door plate comprising:

an attaching structure configured to allow the door plate to attach to the door;

a door plate attaching structure for interfacing with the handle attaching structure for allowing the door handle to pivotally attach to the door plate wherein both the door handle and the door plate are pivotally attached to each other via the handle attaching structure and the door plate attaching structure and the handle attaching structure and the door plate attaching structure are covered by the door handle and the door plate;

a front face; and snag free smooth surfaces located on the door handle and the door plate wherein, the smooth surfaces on the door plate and the door handle are configured to direct a ligature that contacts the door handle system away from the door handle and away from a space between the door handle and the door plate.

16. The door handle system of claim 15, further comprising:

a stop projection located on either one of the door handle and door plate;

a structure defining a stop hole located on the other of the door handle and door plate than the stop projection, the structure defining the stop hole configured and dimensioned to allow the stop projection to fit in the stop hole and limit pivotal movement of the door handle with respect to the door plate; and a spring located in at least one of either the handle attaching structure and the door plate attaching structure and configured to bias the door handle to a particular pivotal position with respect to the door plate.

17. The door handle system of claim 15, further comprising:

an anti-ligature projection located on the door handle; and a channel defining structure in the front face defining a channel in the front face for allowing clearance for the anti-ligature projection to extend through the front face into the channel and move in the channel when the door handle is pivoted with respect to the door plate.

18. A method of keeping elongated members from being retained by a door handle system comprising:

providing snag free smooth surfaces located on a door handle, the door handle having a front surface facing away from a door and having a back surface facing toward the door;

providing snag free smooth surfaces on a door plate;

covering a space between the door handle and door plate with a protrusion on the door handle extending toward the door plate, the protrusion extending closer to the door than the back surface; and defining a handle protrusion channel in the door plate to allow the protrusion on the door handle to move within the door plate when the door handle pivots with respect to the door plate, wherein, the smooth surfaces on the door handle and door plate and protrusion on the door handle are configured to direct elongated members that contact the door handle system away from the door handle and away from a space between the door handle and the door plate.

19. The method of claim 18, further comprising locating the door handle proximate to the door plate.

20. The method of claim 18, further comprising angling the protrusion between 3-5 degrees toward the door plate from a flat surface on a back portion of the door handle.

* * * * *